(12) United States Patent
Veyland

(10) Patent No.: US 12,192,088 B2
(45) Date of Patent: Jan. 7, 2025

(54) PROTOCOL FOR MONITORING COMMUNICATION TRAFFIC

(71) Applicant: Airbus Defence and Space SAS, Toulouse (FR)

(72) Inventor: René Veyland, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 0 days.

(21) Appl. No.: 18/090,201

(22) Filed: Dec. 28, 2022

(65) Prior Publication Data

US 2023/0216772 A1 Jul. 6, 2023

(30) Foreign Application Priority Data

Dec. 31, 2021 (FR) ........................................ 2114713
Jun. 1, 2022 (FR) ........................................ 2205287

(51) Int. Cl.
*H04L 43/50* (2022.01)
*H04L 43/087* (2022.01)
(Continued)

(52) U.S. Cl.
CPC ............ *H04L 43/50* (2013.01); *H04L 43/087* (2013.01); *H04L 43/106* (2013.01); *H04L 43/12* (2013.01); *H04L 47/34* (2013.01)

(58) Field of Classification Search
CPC ..... H04L 43/50; H04L 43/087; H04L 43/106; H04L 43/12; H04L 47/34; H04L 43/0876; H04L 43/0852
See application file for complete search history.

(56) References Cited

U.S. PATENT DOCUMENTS

| 7,961,637 B2 * | 6/2011 | McBeath | H04L 43/106 370/252 |
| 2010/0008363 A1 * | 1/2010 | Ee | H04L 45/72 370/392 |

(Continued)

FOREIGN PATENT DOCUMENTS

EP 2296318 A1 3/2011

OTHER PUBLICATIONS

French Search Report for French Patent Application No. 2205287 dated Jan. 11, 2023; priority document.

*Primary Examiner* — Rachel J Hackenberg
(74) *Attorney, Agent, or Firm* — Greer, Burns & Crain, Ltd.

(57) ABSTRACT

A first network probe is associated with a first router and with a first end-point of the first router, and a second network probe is associated with a second router and with a second end-point of the second router. The first network probe periodically injects flag packets in parallel to the traffic of a communication tunnel between the first and second end-points, with each flag packet including timestamp information expressing a time reference for the injection of the flag packet. Information relating to a timing variation in traffic in the communication tunnel is gathered, with the timing variation being measured due to a difference between the timestamp information contained in the flag packets and timestamp information relating to the instant the flag packets were captured by the second probe. Possible congestion situations experienced by the communication tunnel are assessed as a function of the gathered information.

11 Claims, 10 Drawing Sheets

(51) Int. Cl.
 *H04L 43/106* (2022.01)
 *H04L 43/12* (2022.01)
 *H04L 47/34* (2022.01)

(56) References Cited

U.S. PATENT DOCUMENTS

2011/0063992 A1* 3/2011 Weng ...................... H04L 45/26
 370/252
2011/0064091 A1* 3/2011 Darras .................. H04L 43/106
 370/458

* cited by examiner

| Idx | Seq | FTS | CTS | QoP | QoB |
|---|---|---|---|---|---|
| 0 | 38 | X0 = X | X0 + L0 | QoP0 | QoB0 |
| 1 | 39 | X1 = X + TS | X1 + L1 | QoP1 | QoB1 |
| ... | ... | ... | ... | ... | ... |
| 255 | 293 | X255 = X + 255*TS | X255 + L255 | QoP255 | QoB255 |

Fig. 8

PROTOCOL FOR MONITORING COMMUNICATION TRAFFIC

CROSS-REFERENCES TO RELATED APPLICATIONS

This application claims the benefit of the French patent application No. 2114713, filed on Dec. 31, 2021, and of the French patent application No. 2205287 filed on Jun. 1, 2022, the entire disclosures of which are incorporated herein by way of reference.

FIELD OF THE INVENTION

The present invention relates to the field of network probes for monitoring traffic passing through a communication tunnel, and thus detecting and assessing congestion conditions in communication networks, for example, of the WAN ("Wide Area Network") type.

BACKGROUND OF THE INVENTION

Communication networks are used to provide a wide variety of services, such as exchanging voice communications, typically Voice over IP (VoIP) services, exchanging audio-visual communications, broadcasting multimedia programs, or even accessing data, typically accessing web services. These services have different requirements in terms of transmission latency in the communication networks, and have different priorities.

The communication links that the communication networks rely on are based on physical transmission technologies that can be very diverse. Each of these technologies results in different properties for the transmission channel that is used in terms of capacity, i.e., available bandwidth, error rate, or variability of this available bandwidth.

In order to suitably manage the admission of services while taking into account these different transmission channel properties or in order to build a predictive model of the transmission channel, network probes are used to analyze the traffic passing through these communication networks, and in particular through communication tunnels established between routers of these communication networks.

One problem lies in the precise assessment of the congestion conditions of these communication networks.

Therefore, overcoming at least this disadvantage of the prior art is desirable, and so doing in a simple, effective and inexpensive manner

SUMMARY OF THE INVENTION

To this end, a method is proposed that is implemented in a communication system comprising a plurality of routers, a first network probe being associated with a first router of the plurality of routers and with a first end-point of the first router, a second network probe being associated with a second router of the plurality of routers and with a second end-point of the first router, the method comprising the following steps within the context of monitoring traffic in a communication tunnel between the first end-point and the second end-point: periodically injecting, by the first probe, flag packets in parallel to the traffic of the communication tunnel, with each flag packet including timestamp information expressing a time reference of injection of the flag packet; gathering information relating to a timing variation in traffic in the communication tunnel, with the timing variation being measured due to a difference between the timestamp information contained in the flag packets and timestamp information relating to an instant at which the flag packets were captured by the second probe; assessing possible congestion situations experienced by the communication tunnel as a function of the gathered information. Thus, the difference in the reception timing of the flag packets relative to their transmission timing allows to estimate the timing variation in the communication tunnel that follows the same path as the flag packets, and thus allows any congestion situations that may arise to be precisely assessed.

In a particular embodiment, the method comprises the step of: computing a possible loss of data volume in the communication tunnel, by comparing a data volume count at the output of the communication tunnel between successive flag packets, detected by the second probe, with a data volume count at the input of the communication tunnel between successive flag packets, detected by the first probe.

In a particular embodiment, the flag packets are UDP (User Datagram Protocol) type packets sent on a port dedicated to the flag packets. Thus, the flag packets can be easily captured by the network probes.

In a particular embodiment, the flag packets are injected for each type of service from among a plurality of types of service conveyed by the communication tunnel. Thus, the congestion situations can be assessed for each type of service, and therefore can be assessed more precisely.

In a particular embodiment, the flag packets are injected into a user plane upstream of the first end-point relative to the communication tunnel.

In a particular embodiment, in order to gather the information relating to a timing variation of the data stream in the communication tunnel, at least the second network probe comprises at least one measurement table for storing a sampling log of flag packets captured at the output of the communication tunnel, with each entry of the measurement table corresponding to a sample comprising: a timestamp information field as contained in the flag packet corresponding to the sample in question; a timestamp information field marking the instant at which the flag packet corresponding to the sample in question was captured; a sequence number field as contained in the flag packet corresponding to the sample in question; and a data counting field for counting data passing through the communication tunnel between the flag packet corresponding to the sample in question and the flag packet corresponding to the next sample in the measurement table. Thus, the sampling log is easily constructed by the second probe in order to allow congestion situations to be assessed.

In a particular embodiment, the first probe transmits to the second probe a request requesting to transmit in response information derived from computations of a sampling log of the flag packets received by the second probe, the request involving a range of sequence numbers to be considered, the computations being intended to assess possible congestion situations and including: a minimum transit latency of the flag packets of the range of sequence numbers; a maximum transit latency of the flag packets of the range of sequence numbers; an average transit latency of the flag packets of the range of sequence numbers; a minimum jitter level experienced by the flag packets of the range of sequence numbers; a maximum jitter level experienced by the flag packets of the range of sequence numbers; an average jitter level experienced by the range of sequence numbers; a volume of data passing through the communication tunnel over the range of sequence numbers. Thus, the bandwidth consumption for the second probe to transmit information to the first probe for assessing the congestion situations is reduced.

In a particular embodiment, the first probe transmits to the second probe a request requesting a responding transmission of all or some of the sampling log of the flag packets received by the second probe, the first probe then carrying out computations intended to assess possible congestion situations and including: a minimum transit latency of the flag packets of the range of sequence numbers; a maximum transit latency of the flag packets of the range of sequence numbers; an average transit latency of the flag packets of the range of sequence numbers; a minimum jitter level experienced by the flag packets of the range of sequence numbers; a maximum jitter level experienced by the flag packets of the range of sequence numbers; an average jitter level experienced by the range of sequence numbers; a volume of data passing through the communication tunnel over the range of sequence numbers.

In a particular embodiment, the first network probe comprises at least one further measurement table for storing a sampling log of flag packets captured at the input of the communication tunnel, each entry of this further measurement table corresponding to a sample comprising: a timestamp information field as contained in the flag packet corresponding to the sample in question; a timestamp information field marking the instant at which the flag packet corresponding to the sample in question was captured; a sequence number field as contained in the flag packet corresponding to the sample in question; and a data counting field for counting data passing through the communication tunnel between the flag packet corresponding to the sample in question and the flag packet corresponding to the next sample in the measurement table. Thus, the sampling log is easily constructed by the first probe to allow congestion situations to be assessed.

In a particular embodiment, the first network probe computes additional latency information and additional jitter information, which are related to the quality of service of the first router, by comparing the timestamp information contained in the injected flag packets and the capture timestamp information of the flag packets captured by the first network probe. Thus, the involvement of the router in question in the congestion situations can be easily assessed.

In a particular embodiment, the first probe further estimates a possible loss of data volume that is related to the quality of service of the first router, from detecting losses of flag packets injected by the first probe. Thus, the assessment of the involvement of the router in question in the congestion situations is completed.

A communication system is also proposed comprising network probes and a plurality of routers, with a first network probe being associated with a first router of the plurality of routers and a first end-point of the first router, with a second network probe being associated with a second router of the plurality of routers and with a second end-point of the first router, the communication system comprising electronic circuitry configured to carry out the following steps within the context of monitoring traffic in a communication tunnel between the first end-point and the second end-point: periodically injecting, by the first probe, flag packets in parallel to the traffic of the communication tunnel, with each flag packet including timestamp information expressing a time reference of injection of the flag packet; gathering information relating to a timing variation in traffic in the communication tunnel, with the timing variation being measured due to a difference between the timestamp information contained in the flag packets and timestamp information relating to an instant at which the flag packets were captured by the second probe; assessing possible congestion situations experienced by the communication tunnel as a function of the gathered information.

BRIEF DESCRIPTION OF THE DRAWINGS

The following description of at least one embodiment is set forth with reference to the appended drawings, in which:

FIG. 8 schematically illustrates an example of a measurement table structure;

DETAILED DESCRIPTION OF THE PREFERRED EMBODIMENTS

Figure 1A:
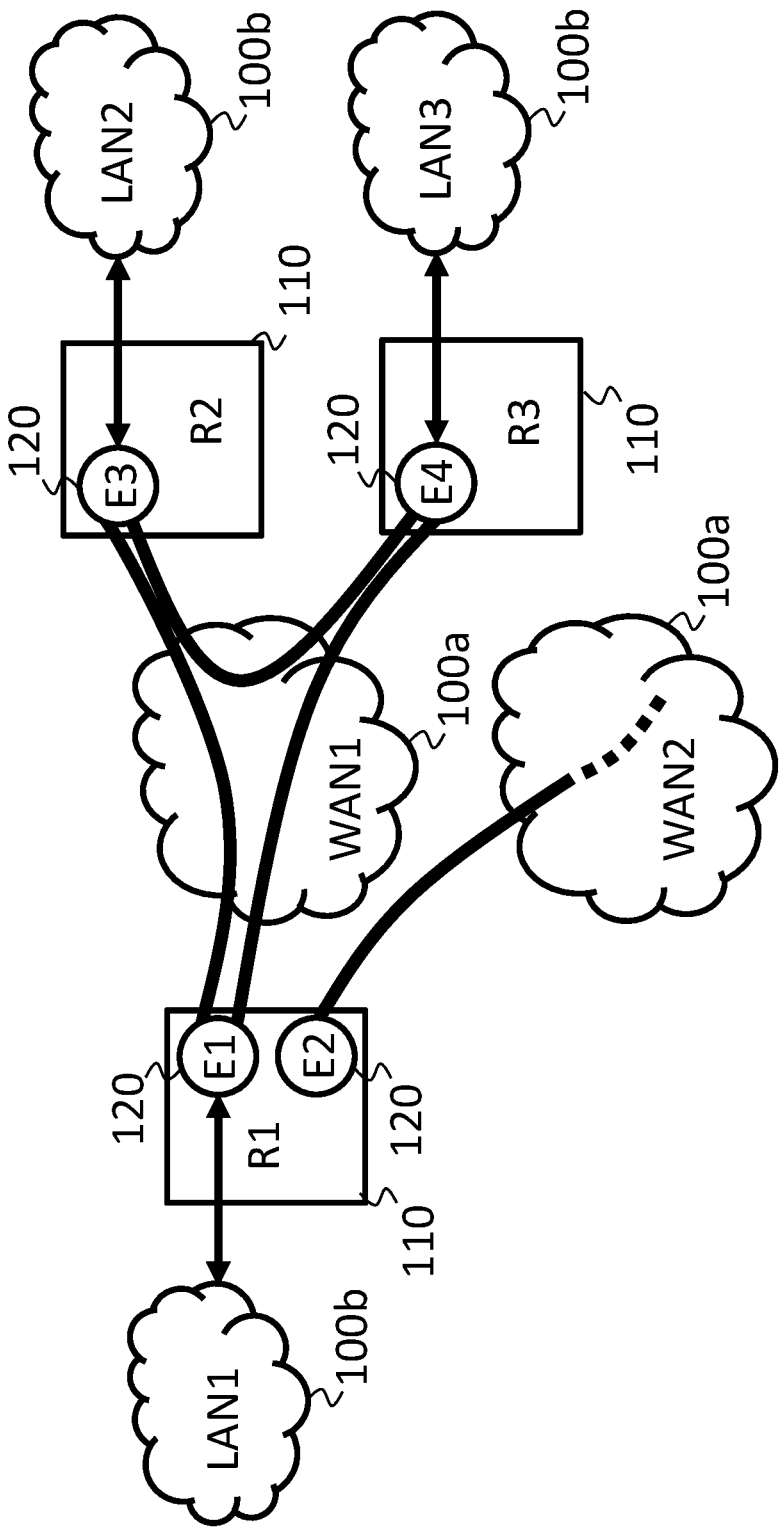
FIG. 1A schematically illustrates a communication system.

FIG. 1A schematically illustrates a communication system.

The communication system comprises a plurality of routers 110. Three routers R1 to R3 are shown in FIG. 1A by way of an illustration. The routers 110 are interconnected by at least one communication network 100a, over which the routers 110 establish communication tunnels. Thus, the routers 110 comprise at least one end-point 120 of a communication tunnel. Each end-point 120 may relate to one or more communication tunnel(s).

Each communication network 100a may be different, namely wired such as Ethernet links, for example, or optical fiber, or radio such as satellite links, for example. Two communication networks WAN1 and WAN2 100a, of the Wide Area Network (WAN) type, are shown in FIG. 1A by way of an illustration.

The communication tunnels are implemented, for example, using the GRE (Generic Routing Encapsulation) protocol, or the mGRE (Multipoint Generic Routing Encapsulation) protocol, or the IPSec (Internet Protocol Security) group of standards. Alternatively, other tunnelling protocols may be used.

Preferably, the communication tunnels are secured by encryption, so that the data encapsulated in the encapsulation protocol of the communication tunnel cannot be decrypted by a device located between the two end-points 120 of the communication tunnel.

For example, the communication tunnels are used to connect other communication networks 100b by means of the routers 110. As illustrated in FIG. 1A, the routers 110 and the communication tunnels allow some Local Area Networks (LANs), such as Wireless Local Area Networks (WLANs), for example, from the IEEE 802.11 group of standards, to be interconnected. In a particular embodiment, the communication system thus allows to securely connect terminals that are present on local networks LAN1, LAN2, LAN3 100b (called red networks) via the wide area network WAN1 100a (called black network). Thus, as illustrated in FIG. 1A, a first communication tunnel is established on the network WAN1 between an end-point E1 of the router R1 and an end-point E3 of the router R2, and a second communication tunnel is established on the network WAN1 between the end-point E1 and an end-point E4 of the router R3. A third communication tunnel is established on the network WAN1 between the end-point E3 of the router R2 and the end-point E4 of the router R3. A fourth communication tunnel is established on the network WAN2 between an end-point E2 of the router R1 and an end-point 120 of another router, not shown.

The communication system is equipped with network probes. The network probes are arranged and configured to take data rate measurements of data entering the communication tunnels and of data exiting the communication tunnels, i.e., at the end-points 120 of the communication tunnels, so as to be able to detect and assess congestion situations in the one or more communication network(s) 100a.

The data rate measurements are measurements, over time periods delimited by flag packets, of volumes of data encapsulated in the communication tunnel protocol. The network probes may be included in or connected to the routers 110, as long as the network probes have access to the data scheme of the routers 110 in order to be able to set up an inter-probe communication protocol and to be able to inject flag packets in order to time the data rate measurements in the communication tunnels, and to capture the volume of packets transmitted in the communication tunnels and the related flag packets.

The inter-probe communication protocol allows the network probes at the end-points 120 of the same communication tunnel to send each other information relating to the measurements in order to assess congestion conditions on the one or more communication network(s) 100a.

The above arrangement ensures that the inter-probe communication protocol follows the same path as the packets of the communication tunnel monitored by the network probes in question.

One the network probe is thus associated with each end-point 120 of the communication tunnels to be monitored in terms of encapsulated data rate. It should be noted that communication tunnels may exist in the communication system even though no network probe is set up at their end-points 120.

Figure 1B:
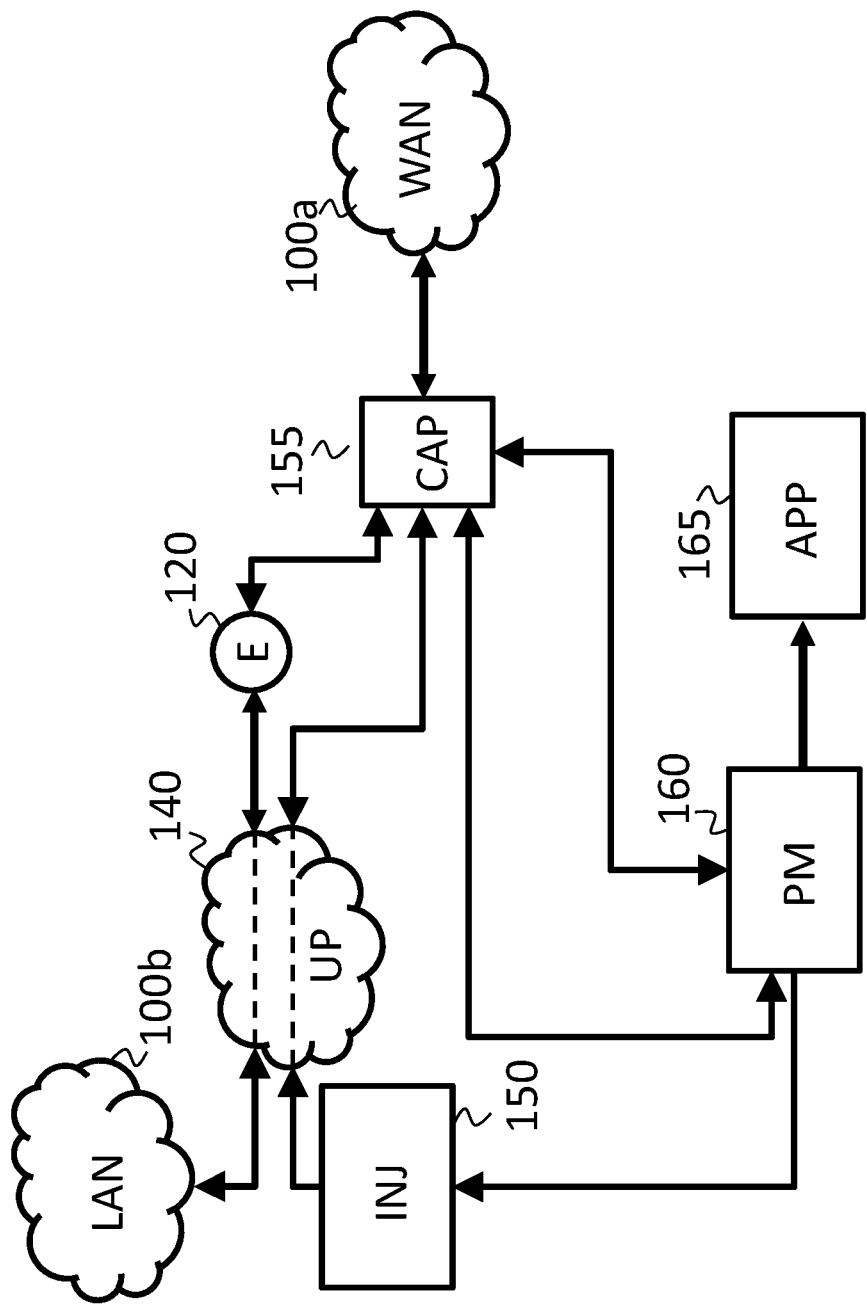
FIG. 1B schematically illustrates a network probe arrangement.

In a particular embodiment, the network probes are arranged as schematically illustrated in FIG. 1B.

FIG. 1B thus shows a modular network probe architecture comprising a network probe manager 160, an injector 150, an application module 165, and a capturing module 155.

The capturing module 155 includes a filtering module for retrieving, via an interface module of the router with which the network probe is associated, data packets relating to communication tunnels. Thus, the filtering module allows, for example, to obtain a copy of any GRE, mGRE or IPSec type data packet that is intended for or emanates from the end-point 120 with which the network probe is associated. Moreover, the filtering module allows to obtain a copy of any flag packet (as described below) included in the traffic of the communication tunnel monitored by the network probe in question. The capturing module 155 preferably includes two sub-modules: a sub-module for capturing traffic entering the communication tunnel and a sub-module for capturing traffic exiting the communication tunnel, with the communication tunnel being two-way. The capturing module 155 thus may be seen as two specialized capture points per end-point 120.

The injector 150 is adapted and configured to inject flag packets in conjunction with the monitored communication tunnel traffic (outbound traffic), i.e., when the network probe in question is associated with the end-point 120 at the input of the communication tunnel. The flag packets are therefore not encapsulated in the communication tunnel protocol, but follow the same path. Indeed, if the communication tunnel protocol uses data encryption, then the flag packets could not be detected on reception. The network probe is configured and adapted so that the network injector 150 injects the flag packets into a user plane 140 upstream of the end-point 120 relative to the monitored communication tunnel, but without the flag packets passing through the communication tunnel in question. The user plane 140 is the data path in the router 110 with which the network probe is associated and by which the packets originating from the communication network 100b pass through that are transmitted in the communication tunnel in question by the local end-point 120. In an alternative embodiment, when the communication tunnel does not use encryption, the flag packets may form part of the traffic passing through the communication tunnel and may be seen by the local end-point 120 as originating from the communication network 100b upstream of the local end-point 120 relative to the monitored communication tunnel. In another alternative embodiment where the traffic in the communication tunnel may be encrypted, the injector 150 injects the flag packets between the end-point 120 at the input of the communication tunnel and the local capturing point of the considered network probe. In all the above cases, this implies that the flag packets are perceptible and detectable by the local capturing point of the network probe in question.

It should be noted that some of the content of the flag packets, not required for the routing thereof, may be encrypted between the network probes that are involved. However, the encryption that is applied is controlled by the network probes in question and is independent of the encryption used by the communication tunnel with which the flag packets in question are associated.

The injector 150 is configured to periodically generate and emit the flag packets, in accordance with a period of a duration that is defined by the network probe manager 160 or by a pre-configuration. The timing of the injected flag packets may be modified or adjusted by the network probe manager 160 over time.

In a particular embodiment, the flag packets are UDP (User Datagram Protocol) packets emitted on a port dedicated to the flag packets. Preferably, such flag packets are injected for each type of service conveyed by the monitored communication tunnel. For example, flag packets are injected by the injector 150 for each DSCP (Differentiated Services Code Point) field value of the communication tunnel packets.

Each flag packet includes timestamp information expressing an injection time reference of the flag packet, and a sequence identifier (Seq).

For example, each flag packet comprises a routing header (for example, of the IP type) comprising a source address field indicating the address of the local network probe, a destination address field indicating the address of the remote network probe, and a type of service field (for example, of the DSCP type) indicating the type of service in which the flag packet in question is part of The size of the routing header is 20 to 40 bytes, for example. In this example, each flag packet then comprises a transport header (for example, of the UDP type) indicating a destination port, and optionally a source port, dedicated to the flag packets (and known to all the network probes in the communication system). The size of the transport header is 8 bytes, for example. Still in this example, each flag packet then comprises a packet type field, for example, with a size of 1 byte and a value of 0. Still in this example, each flag packet then comprises a sequence identifier field that indicates a (cyclic) order number of the flag packet in a series of transmissions of the flag packets by the injector 150, as well as an 8-byte timestamp field expressing a time reference of the emission of the flag packet by the injector 150 with millisecond precision. The flag packets thus constructed allow easy filtering on reception by the network probe on the other side of the monitored communication tunnel.

The network probe manager 160 is configured and arranged to store metrics related to measurements taken due to the capturing module 155, to coordinate the set up and the progress of inter-probe communications for a given communication tunnel, and to consolidate the stored metrics in order to supply the application module 165 with communication tunnel monitoring information.

The network probe manager 160 implements an inter-probe communication protocol, thus allowing the network probe to communicate with one or several other of the network probes within the context of monitoring one or more of the respective communication tunnel(s). A UDP port dedicated to the inter-probe communication protocol is preferably used to this end. Such an inter-probe protocol particularly allows to share information from measurements taken by the network probes or computation information derived therefrom.

In a particular embodiment, each network probe has an address, for communicating in the one or more communication network(s) 100*a*, that is predefined relative to the address of the communication tunnel end-point 120 with which the network probe is associated. This allows the network probes in question to automatically communicate when a new communication tunnel is detected (for example, established). This also allows the filtering of the flag packets transmitted by the injector 150 to be automatically configured by the remote network probe associated with the end-point 120 on the other side of the monitored communication tunnel.

More specifically, the address of the network probe is determined by applying a bijective translation function relative to the address of the end-point 120 with which the network probe is associated.

In a particular embodiment, the address of the network probe is obtained by applying a predefined mapping rule from the address of the end-point 120 with which the network probe is associated.

In a particular embodiment, the address of the network probe is obtained by applying a predefined (positive or negative) offset relative to the address of the end-point 120 with which the network probe is associated.

In a particular embodiment, the address of the network probe is obtained by adding one (i.e., a unit) to the address of the end-point 120 with which the network probe is associated.

The same mechanism applies for defining the addresses of the other network probes of the communication system. Thus, the address of a remote network probe (i.e., on the other side of a monitored communication tunnel) is determined by applying the bijective translation function relative to the address of the end-point 120 with which the remote network probe is associated.

In an alternative embodiment, the network probes have addresses that are independent of the addresses of the communication tunnel end-points 120. Optionally, the injectors 150 have addresses of their own. When a communication tunnel is discovered, the network probe in question notifies the remote network probe of its addressing scheme. To this end, a message is sent on a dedicated port (for example, a dedicated UDP port) to the inter-probe messages, with a dedicated message identifier. The message in question indicates which end-points 120 are affected by the discovered communication tunnel. As the remote probe is configured to receive (listen to) the messages received on this dedicated port, this remote probe can recognize the communication tunnel (the end-point 120) relevant thereto, and the addressing scheme used on the other side of the communication tunnel becomes known thereto. This remote probe in turn may transmit its own addressing scheme in the same way. In a particular embodiment, the flag packets include information indicating which end-points 120 are relevant to the communication tunnel with which the flag packets are associated, as well as the aforementioned addressing scheme.

The messages exchanged within the context of the inter-probe protocol are preferably of a higher priority type of traffic. For example, the messages exchanged within the context of the inter-probe protocol have a DSCP field value of higher priority than the packets that are encapsulated in the monitored communication tunnels (i.e., of higher priority than the communication packets between the communication networks 100*b*). In a particular embodiment, the messages exchanged within the context of the inter-probe protocol have a DSCP field value that corresponds to a maximum possible priority. This allows to limit the impact of congestion situations on the conveyance of the messages exchanged within the context of the inter-probe protocol and thus allows a better reactivity, if necessary, to the congestion situations.

The application module 165 is responsible for gathering information relating to a variation in the timing of data streams in the communication tunnel monitored by the network probe, with the variation in timing being measured due to a variation in the difference between the timestamp information contained in the flag packets and the timestamp information of the capture instant of the flag packets. The application module 165 may carry out computations on the measurements in order to detect and assess congestion situations, taking into account measurements also carried out by an equivalent application module in a remote network probe responsible for monitoring the communication tunnel at its other end-point.

For example, the application module 165 may be responsible for instructing the local router to modify data transmission profiles in the one or more communication network(s) 100*a* so as to take into account, preferably improve (for example, management of admission of services), congestion situations that would be revealed by the measurements carried out or the computations derived therefrom. As an alternative embodiment, the application module 165 is responsible for feeding back to an orchestrator information relating to the completed measurements or to the computations derived therefrom.

Figure 1C:
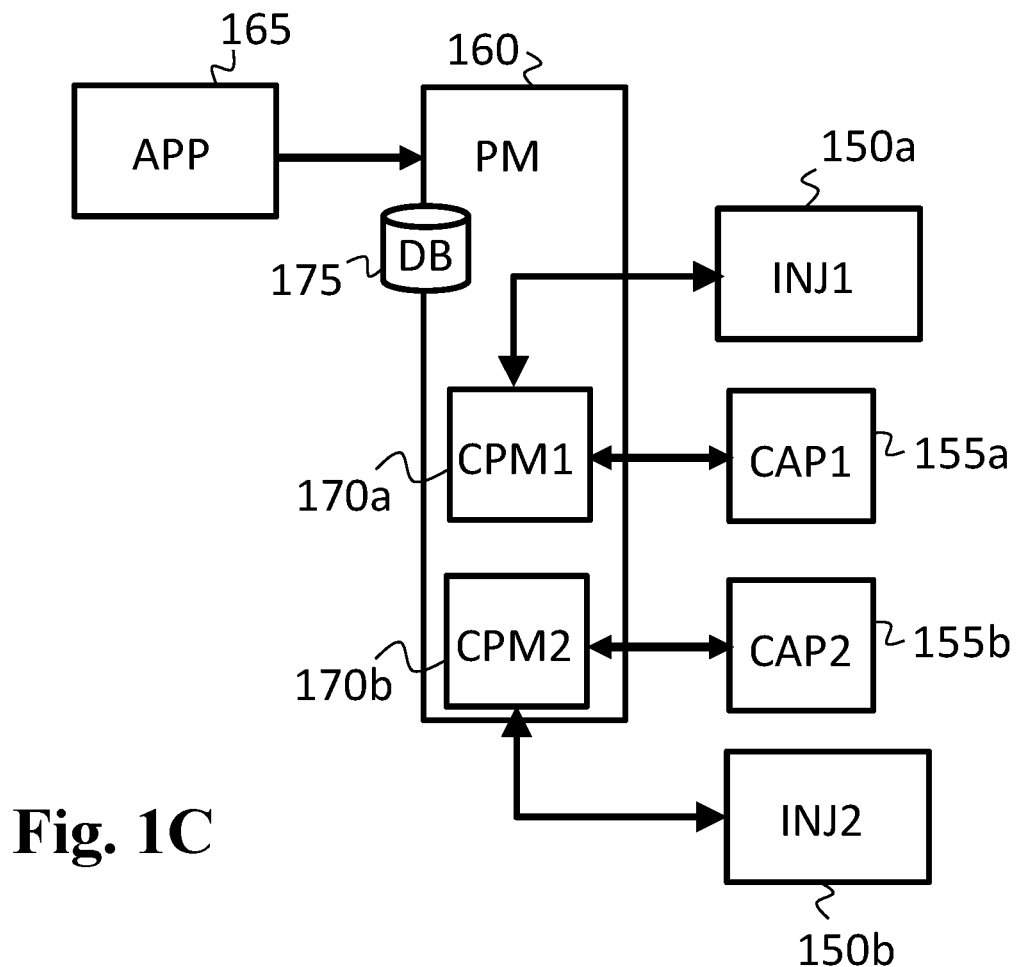
FIG. 1C schematically illustrates a supplementary network probe arrangement.

FIG. 1C schematically illustrates a complementary arrangement of network probe.

In the diagram of FIG. 1C, the network probe manager 160 comprises a control plane manager for each communication tunnel involving the router 110 with which the considered network probe is associated, i.e., for each local injector 150 and each local capturing module 155.

Each control plane manager manages and configures the operations of an injector 150 and a capturing module 155 associated therewith. The control plane manager implements the inter-probe communication protocol for monitoring the communication tunnel for which the injector 150 and the capturing module 155 operate. The control plane manager carries out, or coordinates, the traffic measurement operations via the communication tunnel, as well as any computations derived therefrom.

In FIG. 1C, the considered network probe is associated with a router at the end of two communication tunnels. These communication tunnels may have the same end-point 120 in the router 110 in question, or two separate end-points 120. Two injectors INJ1 150*a* and INJ2 150*b*, and two respective capturing modules CAP1 155*a* and CAP2 155*b*, are thus shown in FIG. 1C. The network probe manager 160 then comprises two respective control plane managers CPM1 170*a* and CPM2 170*b*.

In the diagram of FIG. 1C, the network probe manager 160 further comprises a memory 175, for example, in the form of a database DB. The memory in question may alternatively be external to the network probe manager 160, or even to the network probe itself, and the network probe manager 160 is connected to the memory and has read, write, and delete access to the memory. In particular, the memory 175 is used by the network probe manager 160 to store information relating to captures made by each local capturing module 155, the measurements derived therefrom, metrics related to these measurements, and optionally results of computations carried out on the metrics.

Modular architectures other than that described above with reference to FIGS. 1B and 1C may be designed without departing from the principles and behavior described herein, in particular by otherwise distributing the functions carried out by the modules disclosed above.

Figure 2:
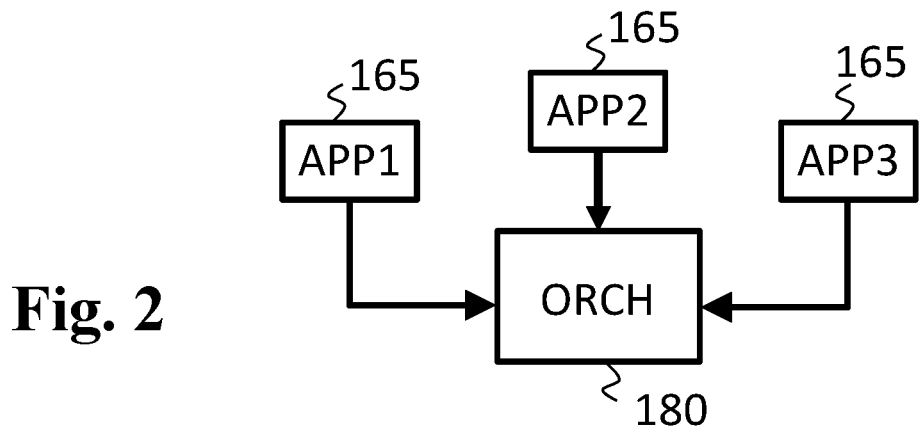
FIG. 2 schematically illustrates a connection of network probes to an orchestrator.

In a particular embodiment, as illustrated in FIG. 2, the network probes communicate with an orchestrator 180, more specifically by means of their application modules 165. The measurements carried out by the network probes or the computations derived therefrom thus may be shared with the orchestrator 180, particularly in order to detect and assess congestion situations on the one or more communication network(s) 100*a* and thus adapt service admissions accordingly. Thus, the communication system is particularly suitable for SD-WAN (Software-Defined Wide Area Network) type infrastructures. In a particular embodiment, the orchestrator 180 defines and enforces a service admission policy in the one or more communication network(s) 100*a* that takes into account the actual communication capacities in the one or more communication network(s) 100*a* and that therefore takes into account the congestion situations revealed by the network probes.

In an alternative embodiment, the measurements performed by the network probes or the computation results derived therefrom are shared with the orchestrator 180 in order to allow the orchestrator 180, or any other centralized computing device or system, to establish a predictive congestion model of the one or more communication network(s) 100*a*.

Figure 3:
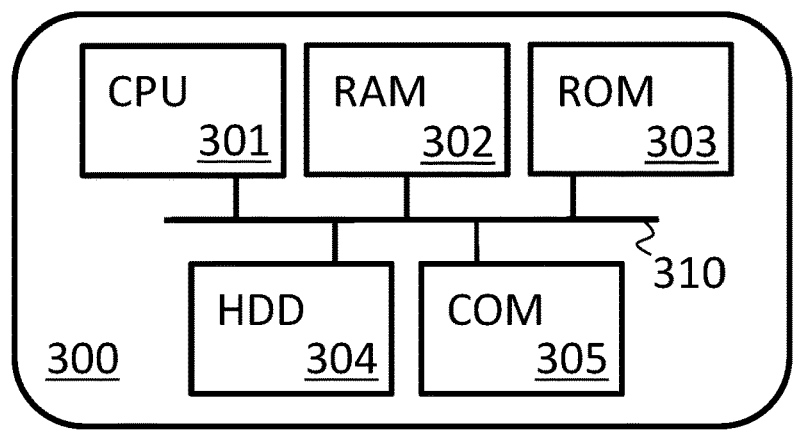
FIG. 3 schematically illustrates an example of a hardware architecture for implementing network probes in the communication system.

FIG. 3 schematically illustrates an example of a hardware architecture of a network probe, and that particularly allows the modular architecture of FIGS. 1B and 1C to be implemented.

The network probe then comprises, connected by a communication bus 310: a processor or CPU (Central Processing Unit) 301, or a cluster of such processors, such as GPUs (Graphics Processing Units); a RAM (Random Access Memory) 302; a ROM (Read-Only Memory) 303, or a rewritable memory of the EEPROM (Electrically Erasable Programmable ROM) type, for example, of the Flash type; a data storage device, such as a Hard Disk Drive (HDD) 304, or a storage medium reader, such as a Secure Digital (SD) card reader; a set of input and/or output interfaces, such as communication interfaces 305, particularly allowing the network probe to capture packets intended for the router with which the network probe is associated, or being conveyed via the router with which the network probe is associated, to inject and capture flag packets as described in further detail hereafter, as well as to communicate with other network probes of the communication system or with the orchestrator 180.

The processor 301 is capable of executing instructions loaded into the RAM 302 from the ROM 303, an external memory (not shown), a storage medium, such as an SD card or the HDD, or a communication network. When the network probe is powered on, the processor 301 is able to read instructions from the RAM 302 and to execute them. These instructions form a computer program causing the processor 301 to implement the steps, behaviors and algorithms described herein.

All or some of the steps, behaviors and algorithms described herein thus may be implemented in software form by a programmable machine, such as a DSP (Digital Signal Processor) or a processor, executing a set of instructions or may be implemented in hardware form by a dedicated machine or chip or chipset, such as an FPGA (Field-Programmable Gate Array) or an ASIC (Application-Specific Integrated Circuit).

It follows that the modular architecture of FIGS. 1B and 1C may be implemented in software form by a programmable machine executing a set of instructions, or may be implemented in hardware form by a dedicated machine or chip or chipset.

In general, each network probe comprises electronic circuitry arranged and configured to implement the steps, behaviors and algorithms described herein, and in particular the modular architecture of FIGS. 1B and 1C.

It should be noted that the orchestrator 180 may also similarly comprise electronic circuitry arranged and configured to implement the steps and behaviors described herein in relation to the orchestrator 180.

Figure 4:
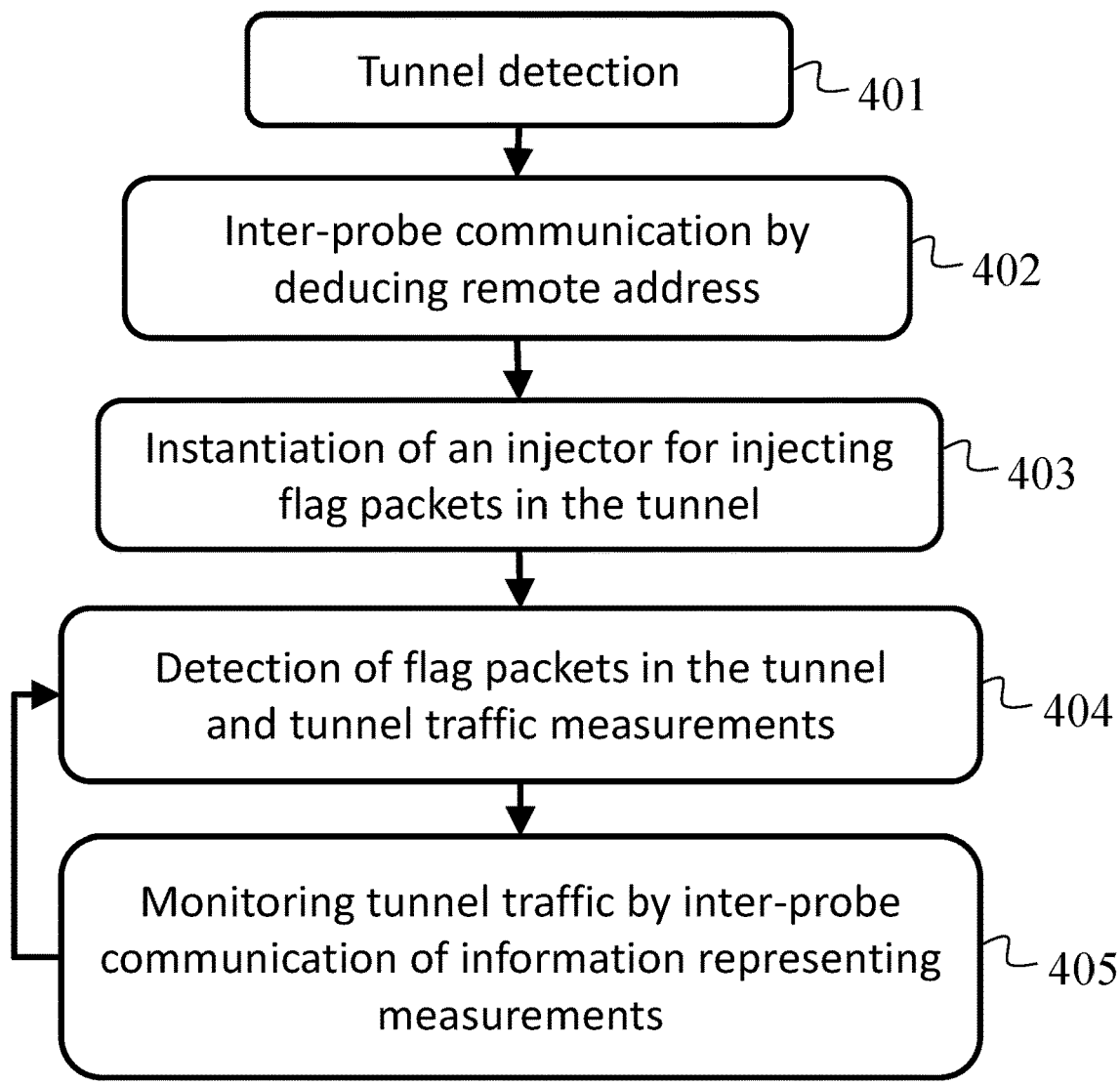
FIG. 4 schematically illustrates a flowchart for setting up a network probe for monitoring a communication tunnel upstream of the communication tunnel.

FIG. 4 schematically illustrates a flowchart for setting up a network probe for monitoring a communication tunnel upstream of the communication tunnel.

In a step 401, the network probe in question detects a new communication tunnel, an end-point of which is the end-point 120 with which the network probe is associated. A new communication tunnel is preferably detected by detecting the transmission of a tunnel encapsulation packet, for example, of the GRE, mGRE or IPSec type, corresponding to a communication tunnel that had not been previously detected. A new communication tunnel is thus detected when the source address and the destination address form a pair of end-points 120 still unknown to the network probe (knowing that the network probe is associated with the end-point 120 at the input of the communication tunnel, for the considered direction of communication).

In a step 402, in a particular embodiment, the network probe deduces the address of a remote network probe, with which the network probe shall collaborate for monitoring the traffic of the communication tunnel in question. To this end, the network probe retrieves the address of the remote end-point, i.e., the one on the other side of the communication tunnel that was recently detected in step 401. The source address corresponds to the end-point 120 with which the network probe is associated; therefore, the address of the remote end-point is the destination address. It should be noted that no Deep Packet Inspection (DPI) is required. The network probe then deduces the address of the remote network probe, with which the network probe shall collaborate for monitoring the communication tunnel in question, by applying the bijective translation function, as already explained above. This deduction of the addresses allows the inter-probe communications and the configuration of the local injector 150 to be established.

Thus, the network probe can carry out an automatic instantiation of inter-probe communications between the network probe, which therefore monitors a first end-point 120 of the communication tunnel in question, and the remote network probe, which monitors the second end-point 120 of this communication tunnel. Automatic instantiation of inter-probe communications can be achieved by predefining the addresses of the network probes relative to the addresses of their respective end-points. Preferably, each network probe opens a network socket with the address of its associated end-point 120, to which the bijective translation function is applied, and with a dedicated UDP port. This allows each network probe to receive UDP messages that are addressed by any other network probe of the communication system to this address and this dedicated UDP port.

As already mentioned, other approaches for sharing addressing scheme may be implemented.

For example, when a communication tunnel is set up between two end-points 120, each of the network probes monitoring one of the ends of the communication tunnel detects the passage of a packet in the communication tunnel.

In a step 403, the network probe instantiates an injector of timing packet in the communication tunnel, i.e., an injector of flag packets. By applying the same algorithm, the remote network probe also instantiates an injector of timing packet in the communication tunnel, thereby creating a reference clock in both directions of communication between the network probes via the communication tunnel.

In a step 404, the network probe detects and measures the data rate for the communication tunnel in question. The data rate measurements are carried out by counting the volume of data transmitted between successive flag packets detected in the outbound traffic of the communication tunnel. The data rate measurements may be carried out per type of service in the communication tunnel, for example, by relying on information of type of service (for example, DSCP field) included in the encapsulation packets of the communication tunnel.

Figure 6:
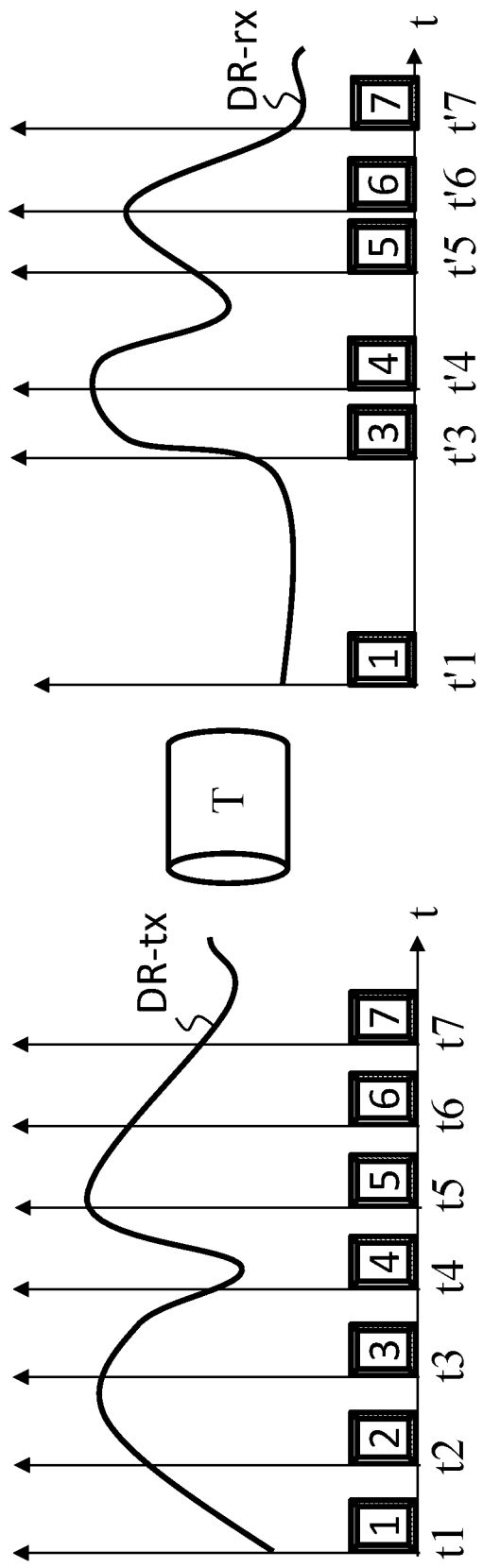
FIG. 6 schematically illustrates a variation in the timing of data streams in a communication tunnel.

In a step 405, the network probe monitors the data traffic in the communication tunnel in question, based on the measurements carried out in step 404. The principle of monitoring the communication tunnel involves comparing the measurements of the data rate entering the communication tunnel (at one end-point) with those of the data rate exiting the communication tunnel (at the other end-point). Information representing the data rate measurements taken by one network probe is transmitted to the other network probe on the other side of the communication tunnel (potentially in both directions), and a difference between these data rates beyond a predetermined margin reveals a congestion. The flag packets are used as a clock reference to determine timing variations between the input and the output of the communication tunnel, as schematically illustrated in FIG. 6.

A loop is then created between steps 405 and 404, so as to monitor the traffic in the communication tunnel in question, in time cycles defined by the transmission frequency of the flag packets.

Figure 5:
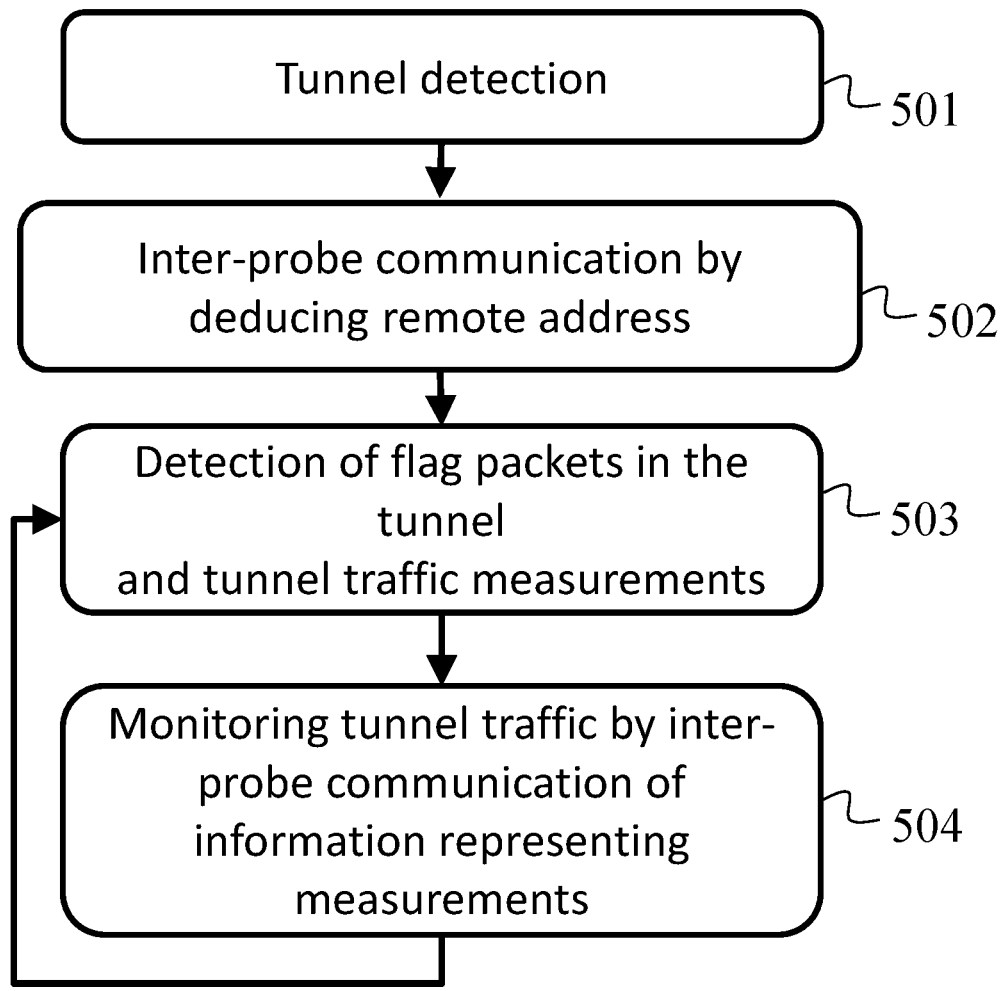
FIG. 5 schematically illustrates a flowchart for setting up a network probe for monitoring a communication tunnel downstream of the communication tunnel.

FIG. 5 schematically illustrates a flowchart for setting up a network probe for monitoring a communication tunnel downstream of a communication tunnel.

In a step 501, the network probe in question detects a new communication tunnel, an end-point of which is the end-point 120 with which the network probe is associated. A new communication tunnel is preferably detected by detecting the reception of a tunnel encapsulation packet, for example, of the GRE, mGRE or IPSec type, corresponding to a communication tunnel that had not been previously detected. A new communication tunnel is thus detected when the source address and the destination address form a pair of end-points 120 still unknown to the network probe (knowing that the network probe is associated with the end-point 120 at the output of the communication tunnel, for the considered direction of communication).

In a step 502, in a particular embodiment, the network probe deduces the address of a remote network probe, with which the network probe shall collaborate for monitoring the traffic of the communication tunnel in question. To this end, the network probe retrieves the address of the remote end-point, i.e., the one on the other side of the communication tunnel that was recently detected in step 501. The destination address corresponds to the end-point 120 with which the network probe is associated; therefore, the address of the remote end-point is the source address. It should be noted that no Deep Packet Inspection is required. The network probe then deduces the address of the remote network probe, with which the network probe shall collaborate for monitoring the communication tunnel in question, by applying the bijective translation function, as already explained above. Step 502 is the equivalent of step 402, on the other side of the communication tunnel, in order to allow inter-probe communications to be established.

As already mentioned, other approaches for sharing addressing scheme may be implemented.

In a step 503, the network probe detects and measures the data rate for the communication tunnel in question. The data rate measurements are carried out by counting the volume of data transmitted between successive flag packets detected in the outbound traffic of the communication tunnel. The data rate measurements may be carried out per type of service in the communication tunnel, for example, by relying on information of type of service (for example, DSCP field) included in the encapsulation packets of the communication tunnel.

In a step 504, the network probe monitors the data traffic in the communication tunnel in question, based on the measurements carried out in step 503. As already mentioned, the flag packets are used as a clock reference to determine timing variations between the input and the output of the communication tunnel, as schematically illustrated in FIG. 6.

A loop is then created between steps 504 and 503, so as to monitor the traffic in the communication tunnel in question, in time cycles defined by the flag packets.

FIG. 6 schematically illustrates a variation in the timing of data streams in a communication tunnel T.

At the input of the communication tunnel, the data are transmitted (for example, for a given type of service) at a rate DR-tx. The injector 150 of the network probe at the input of the communication tunnel transmits, over a constant period, flag packets 1 to 7 in the data stream entering the communication tunnel. Flag packets 1 to 7 are therefore transmitted by the end-point 120 at the input of the communication tunnel at respective instants t1 to t7 separated by a fixed configured period Ts. The period Ts may be defined as a function of an expected (for example, theoretical) bandwidth and latency in the communication network 100a through which the communication tunnel T is established.

At the output of the communication tunnel, the data are received (for example, for a given type of service) at a rate DR-rx that typically differs from the rate DR-tx at the input of the communication tunnel T. Flag packets 1 and 3 to 7 are therefore received by the end-point 120 at the output of the communication tunnel at respective instants t'1 and t'3 to t'7 that are not separated by the fixed period Ts, and, in FIG. 6, packet 2 has been lost en route. The data stream has therefore experienced a timing variation in the monitored communication tunnel T.

Due to the timestamp information contained in the flag packets, the network probe at the output of the communication tunnel is able to determine the timing at the input of the communication tunnel. By determining a timestamp of the flag packets received at the output of the communication tunnel (retrieving information representing the reception instant), the network probe at the output of the communication tunnel is able to determine the timing at the output of the communication tunnel. By comparing the timing at the input of the communication tunnel and the timing at the output of the communication tunnel, the timing variation in the monitored communication tunnel T can be determined. The same reasoning can be applied at the input of the communication tunnel, as soon as the network probe upstream of the communication tunnel has retrieved a timestamped log of measurements taken by the remote network probe receiving the flag packets.

Figure 7:
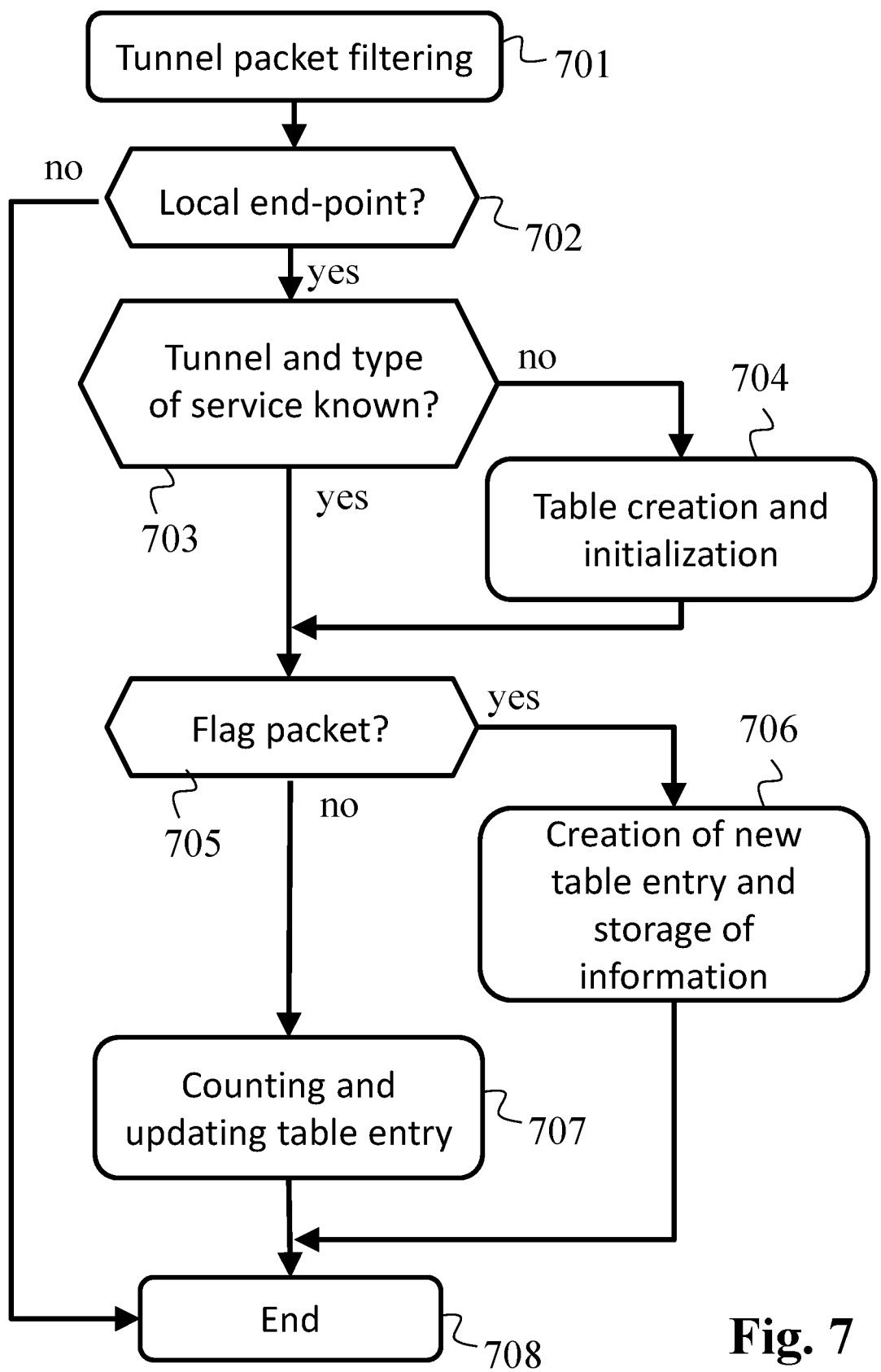
FIG. 7 schematically illustrates a flowchart for creating and updating one or more measurement table(s) storing information representing the data stream timing variation of FIG. 6.

FIG. 7 schematically illustrates a flowchart for creating and updating one or more measurement tables storing information representing the variation in timing of data streams as schematically illustrated in FIG. 6. The flowchart in FIG. 7 is implemented by each network probe, and more particularly by each control plane manager (for example, CPM1 170a) in the modular architecture schematically illustrated in FIG. 1C.

In a step 701, the network probe obtains a data packet from the communication tunnel, resulting from the filtering carried out by the capturing module 155 on the set of data packets passing (transmission/reception) via the end-point 120 with which the network probe is associated.

In a step 702, the network probe determines whether the data packet relates to the end-point 120 with which the network probe is associated. If not, the algorithm is terminated in a step 708; otherwise, a step 703 is carried out. In the case of a role of a network probe that is upstream relative to the communication tunnel, the source address points to the end-point 120 with which the network probe is associated. In the case of a role of a network probe that is downstream relative to the communication tunnel, the destination address points to the end-point 120 with which the network probe is associated.

In step 703, the network probe determines whether the filtered data packet originates from a communication tunnel already known to the network probe. Preferably, as the measurements are carried out per type of service, in this case the network probe also determines whether the type of service is already known for the communication tunnel. The communication tunnel is already known if the source address and the destination address of the filtered packet form a pair of end-points 120 identified in the memory of the network probe. If the above conditions are verified, a step 705 is carried out; otherwise, a step 704 is carried out.

In step 704, the network probe creates a measurement table for the recently detected communication tunnel and/or a table for the recently detected type of service. The network probe initializes each measurement table thus created.

For example, each measurement table is adapted to include 256 samples. When the measurement in question table becomes full, the network probe overwrites the oldest sample when the network probe needs to store a new sample in the measurement table.

In other words, the network probe instantiates a descriptor in the memory (in a database, for example), for the recently detected communication tunnel and/or the recently detected type of service, in order to subsequently store detections and metrics relating to data traffic measurements of the communication tunnel.

Then, step 705 is carried out.

In step 705, the network probe determines whether the filtered data packet is a flag packet. If so, a step 706 is carried out; otherwise, a step 707 is carried out.

In step 706, the network probe creates a new entry in the measurement table that corresponds to the communication tunnel, and optionally to the type of service with which the flag packet corresponds. Each table entry corresponds to a sample.

In a particular embodiment, when the network probe fulfils the role of an upstream probe (i.e., a network probe upstream of the communication tunnel in question for the considered direction of communication), each table entry includes:

- a timestamp information field as contained in the flag packet that resulted in the entry being created in the measurement table;
- a sequence number field as contained in the flag packet that resulted in the creation of the measurement table entry;
- a count field for counting data passing through the communication tunnel, for the considered direction of communication (for the type of service with which the flag packet corresponds, if applicable).

Furthermore, when the network probe fulfils the role of a downstream probe (i.e., a network probe downstream of the communication tunnel in question for the considered direction of communication), each table entry includes:

a timestamp information field as contained in the flag packet that resulted in the entry being created in the measurement table;

a timestamp information field marking the instant at which the flag packet, which caused the creation of the measurement table entry, was received (capture timestamp);

a sequence number field as contained in the flag packet that caused the measurement table entry to be created;

a count field for counting data passing through the communication tunnel, for the considered direction of communication (for the type of service with which the flag packet corresponds, if applicable).

In another particular embodiment, the table entries have the same format irrespective of the role, upstream or downstream, of the probe in question, namely:

a timestamp information field as contained in the flag packet that resulted in the creation of the measurement table entry;

a timestamp information field marking the instant at which the flag packet, which caused the creation of the measurement table entry, was captured (either upstream or downstream of the communication tunnel, depending on the direction of communication to which the measurement table in question applies);

a sequence number field as contained in the flag packet that resulted in the creation of the measurement table entry;

a count field for counting data passing through the communication tunnel, for the considered direction of communication (for the type of service with which the flag packet corresponds, if applicable).

An example of a measurement table structure, for a considered communication tunnel and preferably a considered type of service (for example, DSCP) in the communication tunnel, is schematically illustrated in FIG. 8.

The example in FIG. 8 equally applies upstream or downstream of the communication tunnel. The measurement table structure illustrated in FIG. 8 comprises six columns, referenced 801 to 806.

For each sample, column 801 contains an index value Idx of sample in the measurement table. In this case, the index values Idx are shown in column 801 in ascending values from 0 to 255. The index values Idx represent the order in which the flag packets processed in the measurement table were captured (in a revolving manner, i.e., when the index value Idx entry equal to 255 is full, the next entry to be handled is the index value Idx entry equal to 0).

For each sample, column 802 contains a sequence number Seq as contained in the flag packet that resulted in the creation of the entry in the measurement table corresponding to the index value Idx in question.

For each sample, column 803 contains timestamp information FTS as contained in the flag packet that resulted in the creation of the entry in the measurement table corresponding to the index value Idx in question.

For each sample, column 804 contains timestamp information CTS marking the instant at which was captured the flag packet that resulted in the creation of the entry in the measurement table corresponding to the index value Idx in question.

For each sample, column 805 contains information relating to the quantity of packets QoP passing through the communication tunnel, for the considered direction of communication (for the type of service with which the flag packet corresponds, if applicable). The QoP information indicates the quantity of packets captured between the flag packet, which resulted in the creation of the entry in the measurement table corresponding to the index value Idx in question, and the next flag packet, which resulted in the creation of the entry in the measurement table corresponding to the next index value Idx, for the considered direction of communication (for the type of service with which the flag packet corresponds, if applicable).

For each sample, column 806 contains information relating to the quantity of bytes QoB passing through the communication tunnel, for the considered direction of communication (for the type of service with which the flag packet corresponds, if applicable). The QoB information indicates the quantity of bytes captured between the flag packet, which resulted in the creation of the entry in the measurement table corresponding to the index value Idx in question, and the next flag packet, which resulted in the creation of the entry in the measurement table corresponding to the next index value Idx, for the considered direction of communication (for the type of service with which the flag packet corresponds, if applicable).

In FIG. 8, a sample is stored in each row of the measurement table.

A row 811 stores a sample, with an index value Idx equal to 0, for which:
the sequence number Seq equals 38;
the timestamp information contained in the corresponding flag packet has a value X0 that is equal to X, where X is a reference instant;
the capture timestamp information of the corresponding flag packet has a value X'0 that is equal to X0+L0, where L0 is a capturing latency time relative to the instant X0 when the flag packet in question was transmitted.

A row 812 stores a sample, with an index value Idx equal to 1, for which:
the sequence number Seq equals 39;
the timestamp information contained in the corresponding flag packet has a value X1 that is equal to X+TS, where TS is a fixed predefined timing period value of the flag packets;
the capture timestamp information of the corresponding flag packet has a value X'1 that is equal to X1+L1, where L1 is a capturing latency time relative to the instant X1 at which the flag packet in question was transmitted.

A row 814 stores a sample, with an index value Idx equal to 255, for which:
the sequence number Seq equals 293;
the timestamp information contained in the corresponding flag packet has a value X255 that is equal to X+255*TS;
the capture timestamp information of the corresponding flag packet has a value X'255 that is equal to X255+L255, where L255 is a capturing latency time relative to the instant X255 at which the flag packet in question was transmitted.

During counting operations, columns 805 and 806 are updated in order to respectively indicate the quantities of captured packets and the quantities of captured bytes between successively detected flag packets. Thus, after being filled in: row 811 contains a packet count measurement QoP0 in column 805, and a byte count measurement QoB0 in column 806; row 812 contains a packet count measurement QoP1 in column 805, and a byte count measurement QoB1 in column 806; and row 814 contains a packet count measurement QoP255 in column 805, and a byte count measurement QoB255 in column 806.

The example of a measurement table in FIG. 8 contains other rows 813 containing other samples, between row 812 and row 814, that are not described in further detail in this example.

It should be noted that, as flag packets may be lost, two successive samples in the measurement table may have sequence numbers that are not sequential. This situation more specifically occurs downstream of the communication tunnel, when a congestion on the path taken by the communication tunnel has resulted in packet losses.

With further reference to FIG. 7, step 708 is carried out, in which the algorithm is terminated.

In step 707, the network probe counts the packets passing through the communication tunnel, for the considered direction of communication. The received filtered packet is taken into account in the current sample in the corresponding table. For example, a number of packets received after the flag packet that resulted in the creation of the corresponding entry in the table is incremented by one. In addition, a quantity of data received after the flag packet that resulted in the creation of the corresponding table entry is incremented by the size of the filtered packet. It should be noted that by proceeding in this way the flag packets are not taken into account in the count. It is also possible to take into account the flag packets in the count; in this case, step 706 is followed by step 707 and not by step 708.

The same counting mechanism is thus preferably applied upstream and downstream of the considered communication tunnel.

Then, step 708 is carried out, in which the algorithm is terminated.

In so doing, a log of the sampling carried out by the network probe is stored in memory.

The sampling logs on either side of the communication tunnel allow the congestion situations to be detected and assessed, whether in terms of latency, jitter or packet loss when passing through the communication tunnel. The inter-probe protocol allows the network probes monitoring the same communication tunnel, or the orchestrator 180, to gather these sampling logs, or information derived therefrom by computations, on either side of the communication tunnel, in order to assess possible congestion situations.

In a particular embodiment, one of the network probes (typically the network probe upstream of the communication tunnel, in a considered direction of communication) requests that the other network probe on the other side of the communication tunnel sends thereto sampling log data or information derived from computations in response. A request MeasReq is transmitted to this end within the context of the inter-probe protocol. Preferably, the request includes a field indicating a range of flag packet sequence numbers for which the log, or the information derived from computations, shall be provided in response. Preferably, the request MeasReq itself comprises its own sequence number, which is included in a response MeasResp providing the requested sampling log, in order to facilitate the request-response association.

When a network probe receives a request MeasReq from its counterpart on the other side of the tunnel, the network probe determines which sampling log range is relevant to the request. The network probe then finds the requested sampling log in memory. If, due to packet losses (for example, loss of flag packet 2 in FIG. 6), the sampling log available in the memory of the probe does not match the requested sampling log, then the network probe finds the sampling log closest to the requested sampling log in the memory and transmits it, or information derived therefrom by computations, in the response MeasResp. The response MeasResp includes information indicating which sampling log range has actually been returned, or, respectively, which sampling log range was actually used to derive the returned information.

For example, based on FIG. 6, a request MeasReqs requests the sampling log relating to the range of sequence numbers of flag packets ranging from 2 to 6. Since flag packet 2 was lost en route, the response MeasResp includes the sampling log relating to the range of flag packet sequence numbers ranging from 1 to 6. As an alternative embodiment, the response MeasResp includes the sampling log relating to the range of flag packet sequence numbers ranging from 3 to 6.

Figure 9:
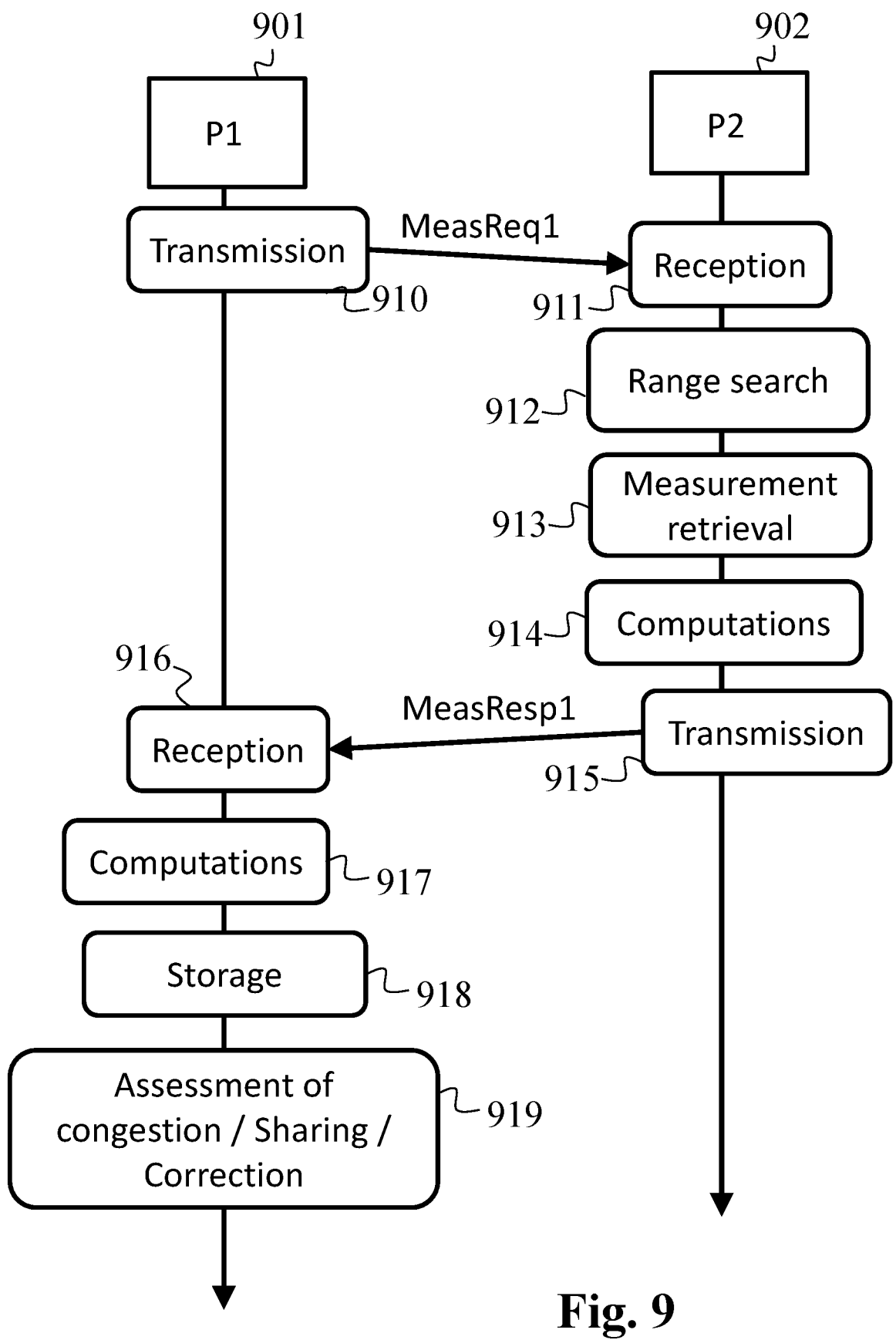
FIG. 9 schematically illustrates a flowchart of the collaboration of network probes for assessing a congestion situation in a communication tunnel, in a first embodiment.

FIG. 9 schematically illustrates a collaboration flowchart of network probes P1 901 and P2 902 for assessing a congestion situation in a communication tunnel, in a first embodiment.

In a step 910, the network probe P1 901, upstream of the communication tunnel, sends a request MeasReq to the probe P2 902, downstream of the communication tunnel. The request MeasReq is of the MeasReq1 type, and preferably includes an indication of at least one type of service (for example, DSCP), as well as a field indicating a range of flag packet sequence numbers, for which latency, jitter and volume computation results must be provided in response. The computations are carried out by the probe P2 902 in view of the sampling log stored by the probe P2 902 relative to the type of service(s) specified in the request MeasReq in the communication tunnel in question. If this is not implicit in the inter-probe protocol, the request MeasReq indicates which communication tunnel is relevant, and which direction of communication is also relevant (for example, by indicating an address of source end-point 120 and destination end-point 120).

In a particular embodiment, the range of sequence numbers is indicated in the request MeasReq only by a sequence number with a lower limit than the range in question, with the implicit understanding that the upper limit of the range in question ends at the last flag packet received by the probe P2 902.

Preferably, the network probe P1 901 stores the sequence number Seq of the last locally captured flag packet and the current volume as seen by the network probe P1 901 when the request MeasReq is sent. This subsequently allows the network probe P1 901 to estimate the loss of data volume in the event that all the flag packets are lost over the range of sequence numbers of flag packets over which the request MeasReq applies.

In a step 911, the network probe P2 902 receives the request MeasReq sent by the probe P1 901.

In a step 912, the network probe P2 902 searches for the range of sequence numbers to which the request MeasReq applies, based on the indications contained in the request MeasReq. If, due to packet losses, the sampling log available in the memory of the network probe P2 902 does not match the sampling log requested by the network probe P1 901, then the network probe P2 902 finds in memory the sampling log closest to the sampling log requested by the network probe P1 901.

In a step 913, the network probe P2 902 selects the one or more appropriate measurement table(s) based on the relevant type of service(s) (for example, DSCP), and retrieves the samples (measurements) that correspond to the requested range of sequence numbers and that are contained in this one or more measurement table(s). This retrieval of samples defines a computation zone from among the sampling log stored by the network probe P2 902.

In a step 914, the network probe P2 902 carries out latency, jitter and volume computations for each requested type of service. With reference to FIG. 8, the network probe P2 902 uses the difference between column 804 and column 803. Preferably, the network probe P2 902 computes:

the minimum transit latency of the flag packets of the considered range of sequence numbers;
the maximum transit latency of the flag packets of the considered range of sequence numbers;
the average transit latency of the flag packets of the considered range of sequence numbers;
the minimum jitter experienced by the flag packets of the considered range of sequence numbers;
the maximum jitter experienced by the flag packets of the considered range of sequence numbers;
the average jitter experienced by the flag packets of the considered range of sequence numbers;
the volume (quantity of packets, bytes, etc.) of data passing through the communication tunnel over the considered range of sequence numbers.

The network probe P2 902 then prepares a response MeasResp. The response MeasResp is of the MeasResp1 type, adapted to provide the information requested by the request MeasReq of the MeasReq1 type.

The network probe P2 902 adds the following retrieved information to the response MeasResp, for each type of requested service:

the range of sequence numbers actually considered;
the current volume (i.e., at the time the request MeasReq is received) of the last received flag packet and the sequence number Seq of the last received flag packet.

Then, in a step 915, the network probe P2 902 sends the response MeasResp, of the MeasResp1 type, thus prepared. The response MeasResp is sent to the network probe P1 901 in response to the request MeasReq received in step 911.

In a step 916, the network probe P1 901 receives the response MeasResp sent by the probe P2 902.

In a step 917, the network probe P1 901 computes a possible loss of data volume (of packets, bytes, etc.) over the range of sequence numbers actually considered by the network probe P2 902 to carry out its computations and construct the response MeasResp. The loss of data volume corresponds to the difference between the volume computed by the network probe P1 901 relative to its own sampling log, over the range of sequence numbers actually considered by the network probe P2 902, and the volume transmitted by the network probe P2 902 in the response MeasResp.

When the sequence numbers forming the limits of the range of sequence numbers of the log returned in the response MeasResp are the same, a total loss of flag packets between two successive measurements has occurred. In this case, the latency and jitter values transmitted by the network probe P2 902 are not taken into account by the network probe P1 901. The network probe P1 901 then computes an approximate value of the loss of data volume. Indeed, when a flag packet has been lost, the volume is accumulated on reception on the sample of the last received flag packet (in other words, by considering that the flag packet of sequence number S2 has been lost, the received volume associated with sequence number S1=S2−1 accumulates the volume of packets not lost en route that were transmitted between the flag packet of sequence number S1 and the flag packet of sequence number S3=S2+1, instead of simply the volume of packets not lost en route that were transmitted between the flag packet of sequence number S1 and the flag packet of sequence number S2). Thus, by considering two successive responses MeasResp, the network probe P1 901 can estimate the loss of data volume by determining the difference in "current volume" information as indicated in the two successive responses MeasResp, and comparing it with the difference in "current volume" information as stored when sending the corresponding request MeasReqs.

In a step 918, the network probe P1 901 stores information for knowing the status of the monitoring of the communication tunnel relative to the sampling logs, for the one or more considered type(s) of service (for example, DSCP). Typically, the network probe P1 901 stores the sequence number Seq of the last received flag packet and the current volume, as indicated by the network probe P2 902 in the response MeasResp.

In a step 919, due to the latency and jitter information transmitted by the network probe P2 902 and of the computation of the possible loss of data volume in step 917, the network probe P1 901 assesses whether a possible congestion situation has been encountered by the communication tunnel, whether in terms of latency, jitter, or packet losses when passing through the communication tunnel. Due to this assessment of the congestion situation, the network probe P1 901 can instruct the local router to modify data transmission profiles in the one or more communication network(s) 100a so as to take into account, preferably improve (for example, management of admission of services), the congestion situations that would be revealed. As an alternative embodiment, the network probe P1 901 feeds back information to the orchestrator 180 relating to the computations, so as to allow the orchestrator 180 to adjust the management of admission of services.

Carrying out the latency, jitter and volume computations on reception allows the message MeasResp to be small compared to sending raw measurements. Thus, the inter-probe protocol has a reduced cost in terms of bandwidth consumption.

However, rather than the downstream network probe carrying out the latency, jitter and volume computations on reception, these computations may be carried out by the upstream probe. The upstream probe shall then retrieve all or part of the sampling log from the downstream probe. This approach is particularly advantageous when the injector 150 is located upstream of the local end-point 120 and the local router in itself entails significant transit latency compared to the transit latency of the monitored communication tunnel. This situation is described hereafter with reference to FIG. 10.

Figure 10:
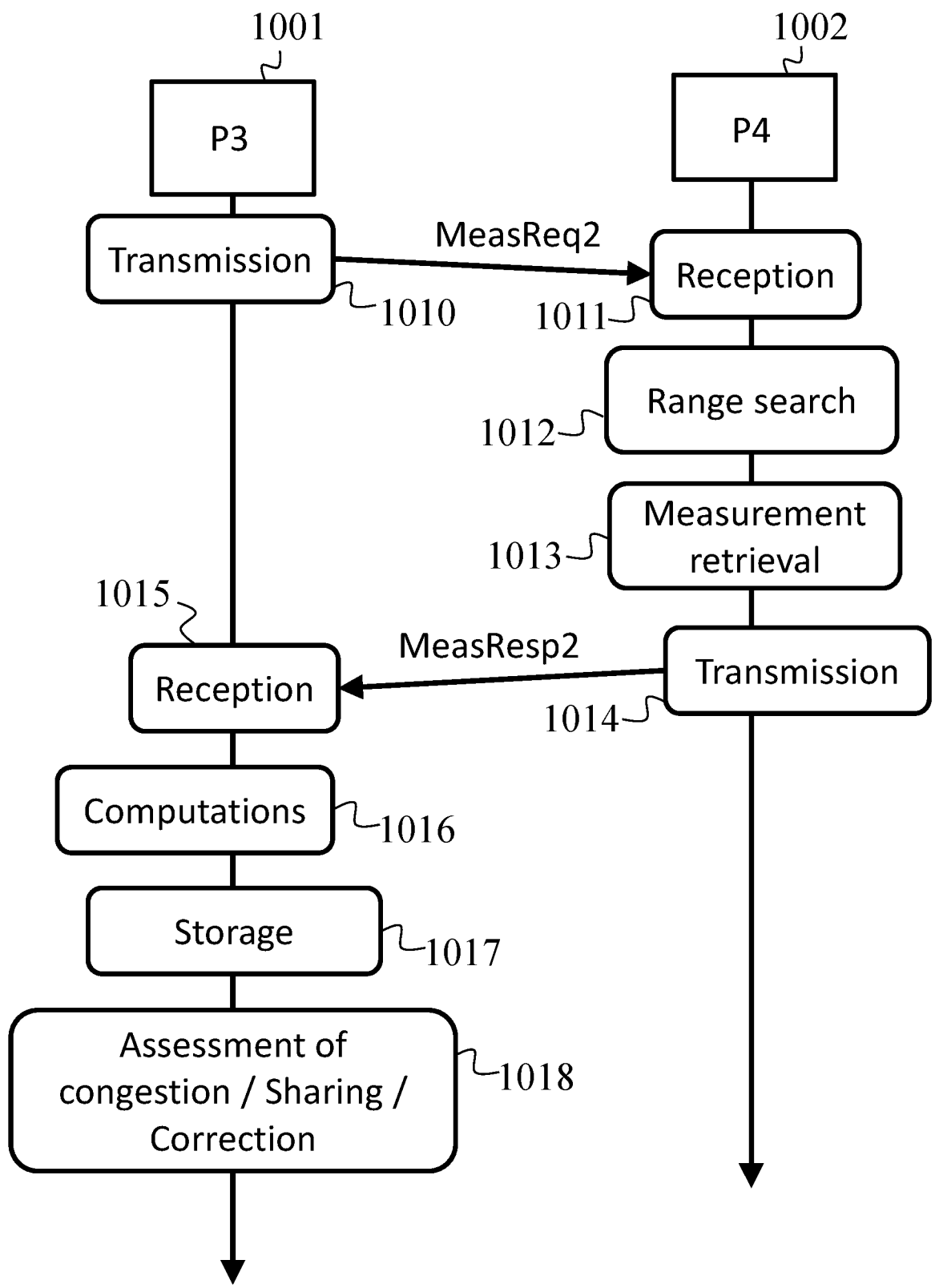
FIG. 10 schematically illustrates a flowchart of the collaboration of network probes for assessing a congestion situation in a communication tunnel, in a second embodiment.

FIG. 10 schematically illustrates a collaboration flowchart of network probes P3 1001 and P4 1002 for assessing a congestion situation in a communication tunnel, in a second embodiment. In this second embodiment, all the computations are carried out by the upstream probe, with the downstream probe simply transmitting all or part of the content of its one or more measurement table(s).

In a step 1010, the network probe P3 1001, upstream of the communication tunnel, sends a request MeasReq to the probe P4 1002, downstream of the communication tunnel. The request MeasReq is of the MeasReq2 type, and preferably includes an indication of at least one type of service (for example, DSCP) for which the sampling log shall be provided in response. If this is not implicit in the inter-probe protocol (for example, the set of one or more relevant measurement table(s)), the request MeasReq contains a field indicating a range of sequence numbers of flag packets, for which the sampling log shall be provided in response. If this is not implicit in the inter-probe protocol, the request Meas- Req indicates which communication tunnel is relevant, and which direction of communication is also relevant (for example, indicating a source end-point 120 and a destination end-point 120 address).

Preferably, the network probe P3 1001 stores the sequence number Seq of the last locally captured flag packet and the current volume as seen by the network probe P3 1001 when the request MeasReq is sent. This subsequently allows the network probe P3 1001 to estimate the loss of data volume in the event that all the flag packets are lost over the range of sequence numbers of flag packets to which the request MeasReq applies.

In a step 1011, the network probe P4 1002 receives the request MeasReq sent by the probe P3 1001.

In an optional step 1012, the network probe P4 1002 searches for the range of sequence numbers to which the request MeasReq applies. Step 1012 is optional in that the inter-probe protocol may imply that the request MeasReq relates to the entire sampling log available to the network probe P4 1002. Otherwise, the network probe P4 1002 searches for the range of sequence numbers according to the indications contained in the request MeasReq. If, due to packet losses, the sampling log available in the memory of the network probe P4 1002 does not match the sampling log requested by the network probe P3 1001, then the network probe P4 1002 retrieves from memory the sampling log that is closest to the sampling log requested by the network probe P3 1001.

In a step 1013, the network probe P4 1002 selects the one or more appropriate measurement table(s) according to the relevant type of service(s) (for example, DSCP), and retrieves the samples (measurements) that correspond to the desired range of sequence numbers and that are contained in this or these measurement table(s).

The network probe P4 1002 then prepares a response MeasResp. The response MeasResp is of the MeasResp2 type, adapted to provide the information requested by the request MeasReq of the MeasReq2 type. The response MeasResp includes the samples (measurements) retrieved in step 1013.

The network probe P4 1002 preferably includes the following retrieved information in the response MeasResp, for each type of requested service:
the range of sequence numbers actually considered;
the current volume (i.e., when the request MeasReq is received) of the last received flag packet and the sequence number Seq of the last received flag packet.

In a step 1014, the network probe P4 1002 sends the response MeasResp, of the MeasResp2 type, thus prepared. The response MeasResp is sent to the network probe P3 1001 in response to the request MeasReq received in step 1011.

In a step 1015, the network probe P3 1001 receives the response MeasResp sent by the probe P4 1002. The network probe P3 1001 thus knows the list of flag packets actually detected by the network probe P4 1002 (and therefore, by deduction, those that were lost en route).

In a step 1016, the network probe P3 1001 carries out latency, jitter and volume computations, for each type of requested service, due to the sampling log received in the response MeasResp. Based on the same data, the network probe P3 1001 can carry out the same computations as the network probe P2 902 in step 914. Thus, preferably, the network probe P3 1001 computes:
the minimum transit latency of the flag packets of the considered range of sequence numbers;
the maximum transit latency of the flag packets of the considered range of sequence numbers;
the average transit latency of the flag packets of the considered range of sequence numbers;
the minimum jitter experienced by the flag packets of the considered range of sequence numbers;
the maximum jitter experienced by the flag packets of the considered range of sequence numbers;
the average jitter experienced by the flag packets of the considered range of sequence numbers;
the volume (quantity of packets, bytes, etc.) of data passing through the communication tunnel over the considered range of sequence numbers.

The network probe P3 1001 also computes a possible loss of data volume (of packets, bytes, etc.) over the range of sequence numbers actually considered (due to possible losses of flag packets). The loss of data volume corresponds to the difference between the volume computed by the network probe P3 1001 relative to its own sampling log, over the range of sequence numbers actually considered, and the volume transmitted by the network probe P3 1001 relative to the own sampling log received in the response MeasResp.

When the sequence numbers forming the limits of the range of sequence numbers of the log returned in the response MeasResp are the same, a total loss of flag packets between two successive measurements has occurred. In this case, the latency and jitter values are not computed by the network probe P3 1001. The network probe P3 1001 then computes an approximate value of the loss of data volume, as already explained above with reference to FIG. 9. Thus, by considering two successive responses MeasResp, the network probe P3 1001 can estimate the loss of data volume by determining the difference in "current volume" information as indicated in the two successive responses MeasResp, and comparing it with the difference in "current volume" information as stored when sending the corresponding requests MeasReqs.

In a step 1017, the network probe P3 1001 stores information for knowing the status of the monitoring of the communication tunnel relative to the sampling logs, for the one or more considered type(s) of service (for example, DSCP). Typically, the network probe P3 1001 stores the sequence number Seq of the last received flag packet and the current volume, as provided by the network probe P4 1002 in the response MeasResp.

In a step 1018, due to the latency, jitter and optionally loss of data computations of step 1016, the network probe P3 1001 assesses whether a possible congestion situation has been encountered by the communication tunnel, whether in terms of latency, jitter, or packet losses when passing through the communication tunnel. Due to this assessment of the congestion situation, the network probe P3 1001 can instruct the local router to modify data transmission profiles in the one or more communication network(s) 100a so as to take into account, preferably improve (for example, management of admission of services), the congestion situations that would be revealed. As an alternative embodiment, the network probe P3 1001 feeds back information to the orchestrator 180 relating to the computations, so as to allow the orchestrator 180 to adjust the management of admission of services.

It should be noted that the algorithm in FIG. 10 may be reversed, i.e., the downstream probe obtains the sampling log from the upstream probe and carries out all the computations.

In a particular embodiment applicable to the algorithms of FIGS. 9 and 10, the network probe P3 1001 computes additional latency information and additional jitter information, which are related to the Quality of Service (QoS) of the local router itself, by comparing the timestamp information contained in the transmitted flag packets and the capture timestamp information of the flag packets captured by the network probe P3 1001. The latency in the communication tunnel is then adjusted by subtracting the latency induced by the router from the latency computation carried out based on the samples received from the network probe P4 1002 Similarly, the jitter in the communication tunnel is then adjusted by subtracting the jitter induced by the router from the jitter computation carried out based on the samples received from the network probe P4 1002. According to an additional embodiment, the network probe P3 1001 also estimates a possible loss of data volume related to the local router itself. Since the network probe P3 1001 does not know the volume of data actually originating from the communication network 100b upstream of the end-point 120 100b, the network probe P3 1001 estimates a possible loss of volume of data originating from the communication network 100b based on the possible losses experienced by its own flag packets (i.e., those injected by the local injector 150 and that should normally be detected by the local capturing point of the upstream network probe).

In a particular embodiment applicable to the algorithms of FIGS. 9 and 10, when the communication tunnels are implemented using the GRE protocol or the mGRE protocol, the flag packets may be injected and detected per type of service (for example, DSCP) and also per stream (for example, LAN IP stream). The stream information per flag packet is then taken into account by the network probes and the computations of volume and possible loss of data volume are carried out per stream and per type of service, instead of being carried out per type of service only.

A particular hybrid embodiment with respect to the algorithms of FIGS. 9 and 10 may also be implemented. In this case, the volume computation is carried out by the downstream network probe, and the latency and jitter computations are carried out by the upstream network probe. To this end, the response MeasResp is of the MeasResp3 type. The response MeasResp then includes the sequence number Seq and timestamp information, but not the data volume information. In relation to FIG. 8, the data contained in columns 805 and 806 is omitted. The response MeasResp also includes the result of the volume computation carried out by the downstream network probe. However, the response MeasResp may nevertheless also include the current volume (i.e., when the request MeasReq is received) of the last received flag packet and the sequence number Seq of the last received flag packet. This allows a trade-off to be found in terms of bandwidth consumption by the inter-probe protocol, while maintaining the accuracy of the results of latency and jitter computations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method implemented in a communication system comprising:
   a plurality of routers,
   a first network probe being associated with a first router of said plurality of routers and with a first end-point of the first router,
   a second network probe being associated with a second router of said plurality of routers and with a second end-point of the first router,
   the method comprising, within the context of monitoring traffic in a communication tunnel between the first end-point and the second end-point:
      periodically injecting, by the first probe, flag packets in parallel to the traffic of the communication tunnel, each flag packet including timestamp information expressing a time reference of injection of said flag packet;
      gathering information, by one of the first network probe or the second network probe, relating to a timing variation in the traffic in the communication tunnel, the timing variation being measured due to a difference between the timestamp information contained in the flag packets and timestamp information relating to an instant at which said flag packets were captured by the second probe, wherein at least the second network probe comprises at least one measurement table for storing a sampling log of flag packets captured by the second probe;
      transmitting, by the first probe, a request to the second probe, the request involving a range of sequence numbers to be considered and requesting to transmit in response information derived from computations of said sampling log using the range of sequence numbers, or to transmit in response all or some of said sampling log which corresponds to said range of sequence numbers so that the first probe performs the computations of said sampling log using the range of sequence numbers and obtains the information derived from the computations;
      assessing, using the information derived from the computations, possible congestion situations experienced by the communication tunnel as a function of said gathered information.

2. The method according to claim 1, further comprising the following step:
   computing a possible loss of data volume in the communication tunnel, by comparing a data volume count at output of the communication tunnel between successive flag packets, detected by the second probe, with a data volume count at input of the communication tunnel between successive flag packets, detected by the first probe.

3. The method according to claim 1, wherein the flag packets are User Datagram Protocol UDP type packets sent on a port dedicated to said flag packets.

4. The method according to claim 1, wherein the flag packets are injected for each type of service from among a plurality of types of service conveyed by the communication tunnel.

5. The method according to claim 1, wherein the flag packets are injected into a user plane upstream of the first end-point relative to the communication tunnel.

6. The method according to claim 1, wherein, in order to gather information relating to a timing variation of data stream in the communication tunnel, each entry of the measurement table corresponds to a sample comprising:
- a timestamp information field as contained in the flag packet corresponding to the sample in question;
- a timestamp information field marking the instant at which the flag packet corresponding to the sample in question was captured;
- a sequence number field as contained in the flag packet corresponding to the sample in question; and
- a data counting field for counting data passing through the communication tunnel between the flag packet corresponding to the sample in question and the flag packet corresponding to the next sample in the measurement table.

7. The method according to claim 6, wherein the computations include:
- a minimum transit latency of the flag packets of said range of sequence numbers;
- a maximum transit latency of the flag packets of said range of sequence numbers;
- an average transit latency of the flag packets of said range of sequence numbers;
- a minimum jitter level experienced by the flag packets of said range of sequence numbers;
- a maximum jitter level experienced by the flag packets of said range of sequence numbers;
- an average jitter level experienced by said range of sequence numbers; and
- a volume of data passing through the communication tunnel over said range of sequence numbers.

8. The method according to claim 1, wherein the first network probe comprises at least one further measurement table for storing a sampling log of flag packets captured at input of the communication tunnel, with each entry of this further measurement table corresponding to a sample comprising:
- a timestamp information field as contained in the flag packet corresponding to the sample in question;
- a timestamp information field marking the instant at which the flag packet corresponding to the sample in question was captured;
- a sequence number field as contained in the flag packet corresponding to the sample in question; and
- a data counting field for counting data passing through the communication tunnel between the flag packet corresponding to the sample in question and the flag packet corresponding to the next sample in the measurement table.

9. The method according to claim 8, wherein the first network probe computes additional latency information and additional jitter information, which are related to a quality of service of the first router, by comparing the timestamp information contained in the injected flag packets with the capture timestamp information of the flag packets captured by said first network probe.

10. The method according to claim 9, wherein the first probe further estimates a possible loss of data volume that is related to the quality of service of the first router, from detecting losses of flag packets injected by the first probe.

11. A communication system comprising:
network probes and a plurality of routers,
- a first network probe among said network probes being associated with a first router of said plurality of routers and with a first end-point of the first router, a second network probe among said network probes being associated with a second router of said plurality of routers and with a second end-point of the first router, the communication system comprising electronic circuitry configured to carry out, within the context of monitoring traffic in a communication tunnel between the first end-point and the second end-point:
periodically injecting, by the first probe, flag packets in parallel to the traffic of the communication tunnel, each flag packet including timestamp information expressing a time reference of injection of said flag packet;
gathering information, by one of the first network probe or the second network probe, relating to a variation in the traffic timing in the communication tunnel, the timing variation being measured due to a difference between the timestamp information contained in the flag packets and timestamp information relating to an instant at which said flag packets were captured by the second probe, wherein at least the second network probe comprises at least one measurement table for storing a sampling log of flag packets captured by the second network probe;
transmitting, by the first probe, a request to the second probe, the request involving a range of sequence numbers to be considered and requesting to transmit in response information derived from computations of said sampling log using the range of sequence numbers, or to transmit in response all or some of said sampling log which corresponds to said range of sequence numbers so that the first probe performs the computations of said sampling log using the range of sequence numbers and obtains the information derived from the computations; and
assessing, using the information derived from the computations, possible congestion situations experienced by the communication tunnel as a function of said gathered information.

* * * * *